INVENTOR.
NATHAN S. LIEPTZ
BY Isler & Ornstein
ATTORNEYS

Nov. 22, 1966  N. S. LIEPTZ  3,286,596
AUTOMATIC KEY CUTTING MACHINE
Filed Dec. 31, 1964  2 Sheets-Sheet 2

INVENTOR.
NATHAN S. LIEPTZ
BY *Isler & Ornstein*
ATTORNEYS

United States Patent Office 3,286,596
Patented Nov. 22, 1966

3,286,596
AUTOMATIC KEY CUTTING MACHINE
Nathan S. Lieptz, Beachwood, Ohio, assignor, by mesne assignments, to Curtis Noll Corporation, Cleveland, Ohio, a corporation of Ohio
Filed Dec. 31, 1964, Ser. No. 422,821
13 Claims. (Cl. 90—13.05)

This invention relates generally to key cutting machines of the type used to cut or grind the edges of a key blank for purposes of providing it with a desired configuration for use in a lock. More particularly, the invention relates to a power driven key duplicating machine, in which the cuts on a selected key blank are duplicated from an original or master key, the contour of which is followed by the cutter.

Machines of this type, in which the cutter or grinder is motor driven, are known and are in use by locksmiths. Such machines sometimes include a rotary wire brush, mounted on the same spindle as the cutter, which is used by the locksmith for deburring the cut key blank after the cutting operation has been completed. The locksmith removes the cut key from its holder and manually places it against the rotating wire brush in order to remove the chips and burs which have been created during the cutting operation. In most such machines, the locksmith or operator manually traverses the clamped key blank across the rotating cutter in order to obtain the desired sequence and contour of cuts in the blank.

It is a primary object of my invention to provide a key duplicating apparatus of the character described, in which the cutting and wire brushing operations are automatically performed in proper sequence without the need of manual attention by the operator.

A further object of my invention is to provide an improved power traversing drive mechanism which has special advantages and utility in such a key cutting apparatus.

Another object of my invention is to provide an automatic power shut-off for the key cutting machine upon completion of its operative cycle.

Still another object of my invention, is to provide means for selectively permitting either manual or powered traverse of the key blank across the cutter.

Other objects and advantages of my invention will become apparent during the course of the following description.

In the accompanying drawings forming a part of this specification and in which like numerals are employed to designate like parts throughout the same, FIG. 1 is a top plan view of a key cutting machine embodying the features of my invention, portions thereof being broken away for clarity of detail.

Figure 1:
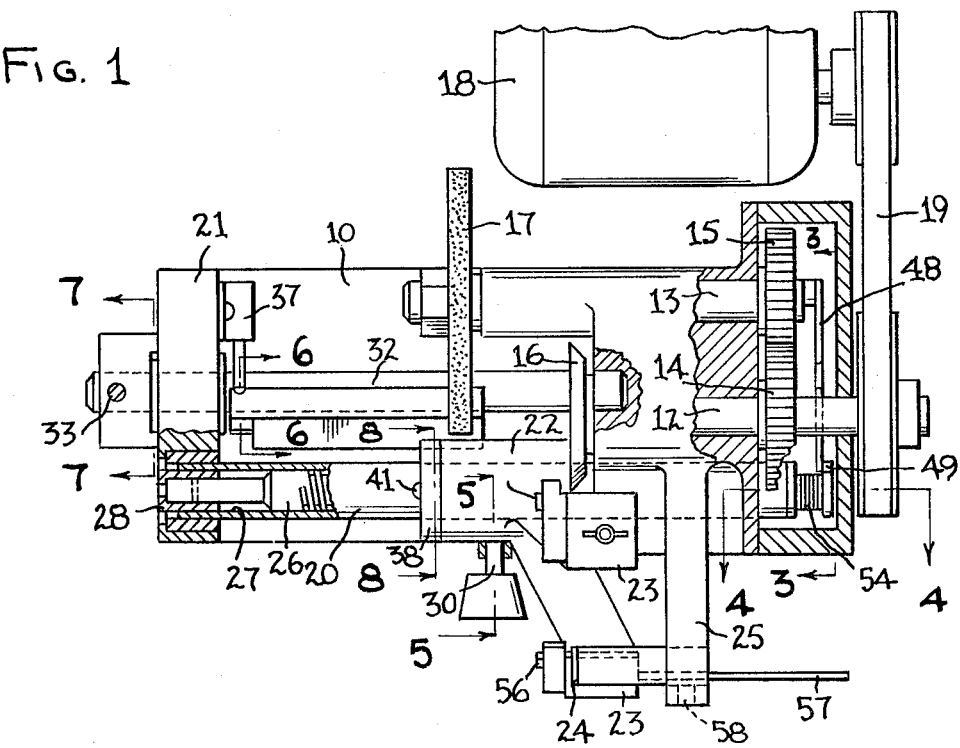
Figure 2:
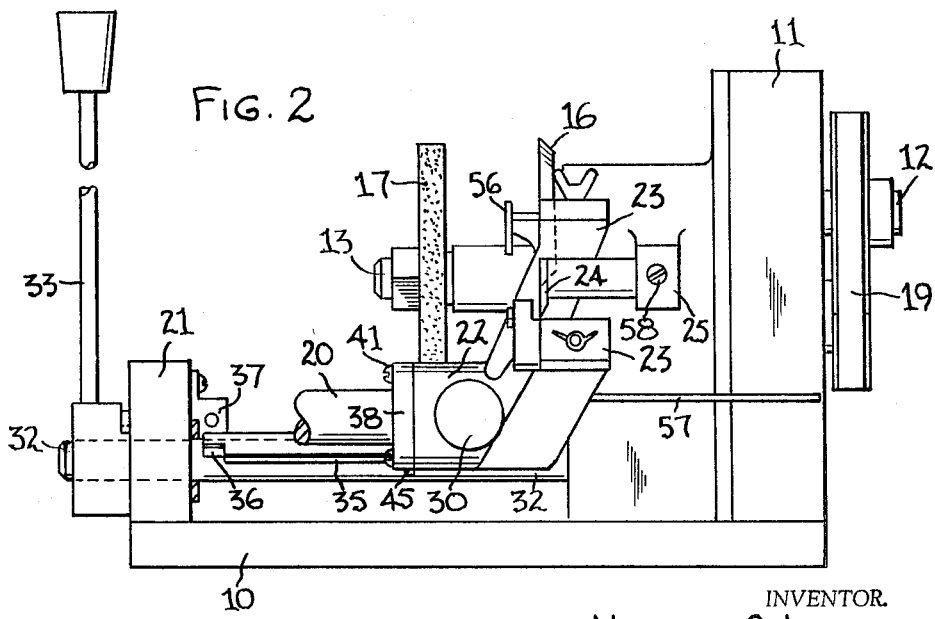
FIG. 2 is a front elevation of the same.
Figure 3:
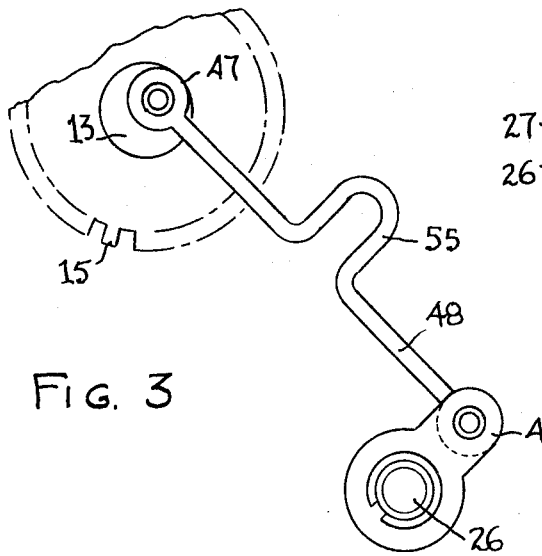
FIG. 3 is a fragmentary cross-sectional view taken as indicated on line 3—3 of FIG. 1, and showing certain details of the traversing drive mechanism.
Figure 4:
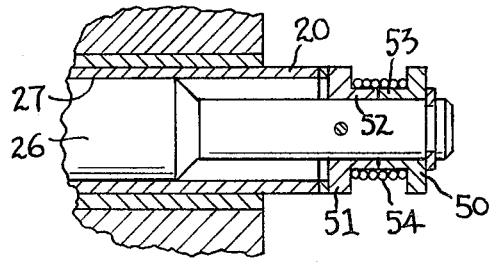
FIG. 4 is a fragmentary cross-sectional view taken as indicated on line 4—4 of FIG. 1 and showing a portion of the traversing mechanism.
Figure 5:
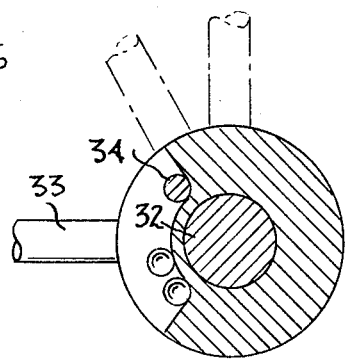
FIG. 5 is a fragmentary cross-sectional view, taken as indicated on line 5—5 of FIG. 1, and showing details of the traverse engaging clutch.
Figure 7:
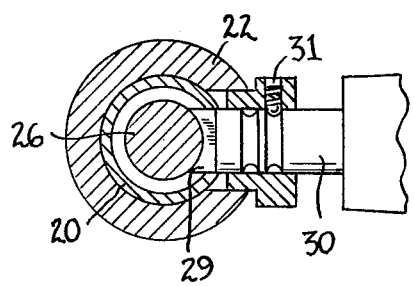
FIG. 7 is a fragmentary cross-sectional view, taken as indicated on line 7—7 of FIG. 1, and showing details of the control handle arrangement.
Figure 6:
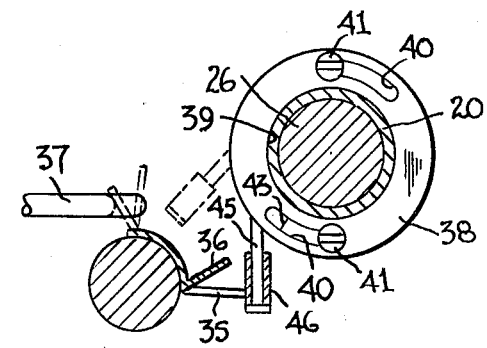
FIG. 6 is a cross-sectional view, taken as indicated on line 6—6 of FIG. 1.
Figure 8:
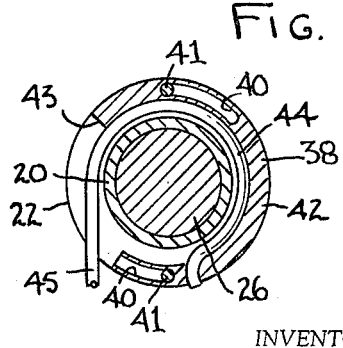
FIG. 8 is a fragmentary cross-sectional view, taken as indicated on line 8—8 of FIG. 1, and showing details of the spring-loading arrangement for the key holders.

Referring more particularly to FIGS. 1 and 2 of the drawings, my automatic key cutting machine includes a base 10 of any suitable construction. At one end of the base 10 there is provided a gear box or housing 11 in which are journalled the rotatable shafts 12 and 13, each of which is respectively connected to one of the intermeshed spur gears 14 or 15. The inboard end of the shaft 12 has secured thereto a cutting or grinding wheel 16 which is caused to rotate counterclockwise, as viewed from the righthand side of FIG. 1. The shaft 13 is disposed horizontally rearwardly of the cutter wheel 16 and has affixed to its inboard end a rotary wire brush 17. The wire brush 17 is displaced inboardly from the cutter wheel 16, and by reason of the meshed gears 14 and 15, is caused to rotate in a direction opposite to that of the cutter wheel, i.e. clockwise as viewed from the righthand side of FIG. 1. The shafts 12 and 13 will ordinarily be rotated at a speed of approximately 1100 r.p.m.

The shaft 12 is powered by means of an electrical motor 18 which may be connected to the shaft in any suitable or desired manner, and is here shown as being operatively connected to the outboard end of the shaft 12 by means of a belt and pulley drive 19. It will be understood that the motor 18 could be mounted directly on the housing 11 or could be connected directly to the shaft 12 or to the gear 15 or 14, if desired.

A hollow traversing rod 20 is rotatably and slidably journalled in the housing 11 and extends horizontally across the base 10 to the opposite end thereof where it is slidably and rotatably received in a journal block 21. Fixedly secured to the traversing rod 20 is a carriage 22 having a pair of key blank clamping devices 23 provided thereon. These clamping devices or key vises 23 are of conventional structural arrangement and are well known in the art, so that they need no further description. The clamping vises 23 are centered in substantially the same vertical plane, but are radially displaced from each other relatively to the axis of the rod 20, so that one of the clamps 23 may be considered to be a lower clamp and the other may be considered as the upper clamp. As will appear more fully hereinafter, the upper clamp 23 is intended to receive and hold an uncut key blank for engagement with the cutting wheel 16, while the lower clamping vise 23 is intended to receive and hold an original or master key on which the cuts or wards have already been formed which are to be duplicated on the blank key. The lower clamp 23 is adapted to bring the pattern or master key into engagement with a fixed cam 24 which is adjustably secured to a support arm 25 which extends from the housing 11. The edge of the cam 24 is adapted to abut or ride upon the wards or cuts of the pattern key at the same time as the key blank held in the upper clamp 23 is engaging the cutter wheel 16.

A square-threaded screw 26 is journalled in the housing 11 and extends into the bore 27 of the hollow traversing rod 20, where it is connected to a sleeve bearing 28. A pin-type of clutch 29, carried by a slidable rod 30, traverses the carriage 22 and is adapted to selectively engage the screw 26 so as to cause the carriage 22 and rod 20 to be moved laterally, from right to left as viewed in FIG. 1, in response to rotation of the screw 26. By means of a detent arrangement 31, the clutch is yieldably maintained in screw-engaging position or in disengaged position, as desired.

A control shaft 32 is rotatably mounted between the housing 11 and the block 21 and has a control handle 33 attached thereto, by means of which the control shaft 32 can be rotated to selected positions. A detent arrangement 34 yieldably maintains the control handle 33 in one of three selected positions, which are designated "Off," "Manual" and "Automatic." Secured to the control shaft 32 for rotation therewith, is a tensioning element in the form of a cam having a radially extending substantially horizontal flange 35 which is at least coextensive in length with the length of operative traversing movement of the carriage 22. That portion of the cam 35 which is adjacent to the block 21 is bent upwardly to provide an ear 36 which is adapted to engage a normally closed limit switch 37 which is mounted on the interior face of the block 21. The switch 37 is a circuit element in the electrical circuit to the motor 18. When the control handle is in its most rearward or "Off" position, the ear 36 engages the switch 37 to open the circuit to the motor 18. When the ear 36 is rotated by the control handle 33 to a position where it disengages from the switch 37, the motor circuit is closed.

Secured to one end of the carriage 22, is an adjustable tensioning device for the carriage and holders 23. The tensioning device includes a collar or cap 38 having a central bore 39 through which the traversing rod 20 is permitted to extend. The face of the cap 38 is provided with a pair of elongated slots 40 through which screws 41 extend into securing engagement with the end of the carriage 22. The cap is provided with an axially extending side wall 42, a portion of which is recessed or cut away as at 43. A coil spring 44 is mounted on the traversing rod 20 within the collar 38 and has a free end thereof, 45 projecting from the collar 38 through the recess 43. The other end of the coil spring is anchored to the collar 38 by any suitable means. The spring end 45 may be provided with a roller or sleeve 46 which is adapted to ride on the edge of the tensioning element 35.

In order to simplify the structure of the key cutting machine and reduce the number of components required, the traversing screw 26 is rotated at slow speed by means of a crank-arm arrangement, which will now be described. The outboard end of the shaft 13 is provided with an eccentric or off-center bearing 47 to which is secured one end of a driving link 48, the other end of which is secured to the crank arm 49 of a hub 50 which is rotatably mounted on the end of the traversing screw 26. A collar 51 having an extension of reduced diameter 52 is fixed to the screw 26 inboard of the hub 50. The extension 52 is of substantially the same diameter as the diameter of the hub 50 and is in abutment therewith so as to provide, in combination, a cylindrical surface or drum 53. A coil spring 54 is carried between the hub 50 and the collar 51 and rotatably embraces the drum 53. The spring 54 serves as a uni-directional clutch to translate the reciprocating movement of the link 48 and the crank arm 49 into rotary movement of the traversing screw 26. The frictional fit between the spring 54 and the drum 53 is such that when the crank arm 49 moves in one direction, so as to tend to coil the spring 54 more tightly, the spring couples the hub to the collar 51 and causes rotation of the screw 26. When the link and crank arm move in the opposite direction, there is a slight tendency for the coils of the spring 54 to expand, so that counter-rotation of the hub 50 is not translated into any movement of the collar 51 or the traversing screw 26. Although this rotative movement of the traversing screw 26 is intermittent, the reciprocation of the link 48 and the crank arm 49 is sufficiently rapid so that for practical purposes the traversing screw is caused to rotate smoothly and slowly.

The connecting link 48 is preferably formed of wire and is provided with a large off-set bend 55 which is of large enough dimension to permit the link to yield in response to rotation of the shaft 13, if, for some reason, the traversing screw 26 should jam. This arrangement not only prevents breakage of the link 48, but also may prevent damage to other components of the key cutting machine if the traversing mechanism should jam. The link 48 is heavy enough and rigid enough to properly perform its normal function during normal operation of the key cutting machine.

*The operation of the key cutting machine*

Assuming that the carriage 22 is in its extreme left-hand position, as viewed in FIG. 1, and that a key cutting cycle has been completed, the ear 36 of the tension element 35 will be in contact with the switch 37 to maintain it in open position. The motor 18 would not be running and the key cutting machine would not be operative. The master or pattern key is secured in the lower clamping device 23 and the appropriate key blank to be cut is similarly secured in the upper clamping vise 23. Pivoted shoulder gauges 56 are provided on the clamping vises 23 for the purpose of properly positioning the respective keys in the clamping devices, in a manner known to the art. At this position of the carriage 22, the free end 45 of the coil spring 44 is free of any restraint and the weight of the carriage 22 causes it to rest in its lowermost position of rotation, against the base 10.

Clutch 29 has been retracted by riding out of the thread of screw 20, so that there will be no interference between the traversing screw 26 and relative slidable movement of the traversing shaft 20. The carriage 22 is now rocked or rotated upwardly from its position of rest, and moved to the right, as viewed in FIG. 1, to a position where the shoulder of the master key engages the edge of the cam 24, which should simultaneously bring the cutter wheel into registry at a counterpart portion of the key blank in the upper clamping vise 23. It will be noted that the spring end 45 now underlies and is disposed in the rotative path of movement of the tensioning element 35.

The cam 24 is secured to arm 25 by means of a screw 58 which, when loosened, permits some degree of pivotal adjustment of the cam 24 relatively to the lower clamping device 23. This adjustment of the cam is utilized in initially setting the cam in relation to its clamping vise 23 for coincident registry of the cutting wheel 16 with the upper clamping vise 23, so that precise duplication of the pattern key is effected. Subsequently, as a result of normal use and wear on the cam 24 and cutting wheel 16, minor adjustments of the position of the cam 24 may be occasionally desirable in order to compensate for such wear and maintain the proper registry of the cam 24 and wheel 16.

The control handle 33 is now rotated forwardly to the "Automatic" position, causing the ear 36 to disengage from the switch 37 and close the circuit to the motor 18. At the same time, the tensioning element 35 bears against and biases the spring end 45 of the coil spring 44 and energizes it. During this tensioning movement of the element 35, the spring end 45 will move from the upper end of the recess 43 toward lower end thereof, an arc which may be as great as 90°. This energization of the coil spring 44 yieldably maintains the pattern key in abutment with the cam 24 at substantially constant pressure during the traversing movement of the carriage 22.

The operating force or pressure of the spring 44 can be initially adjusted, and from time to time thereafter as occasion requires, by rotation of the cap 38 in one direction or the other. Such adjustment is accomplished by loosening the retaining screws 41, whereby the cap may be rotated through the substantial arc permitted by the slots 40. When the proper tension of spring 44 has been selected, the cap is again secured by the screws 41 in the selected position of angularity. In this way, very fine adjustment in the operating force of spring 44 can be effected for optimum performance of the key cutting machine.

The upper clamp 23 is at such a heighth that it brings the key blank into diametrical cutting engagement with the wheel 16 so that a clean and precise cut is obtained in response to the rocking movement of the carriage 22 as the pattern key traverses the edge of the fixed cam 24. It will be understood that at the time the control handle 33 is moved to "Automatic" position, or preferably immediately prior thereto, the rod 30 is manipulated to reengage the clutch 29 with the screw 26. This provides power-driven traversing movement to the carriage 22 and the keys carried thereby, at a uniform speed from the righthand side toward the lefthand side of the apparatus. During this movement, the rotating cutting or abrading wheel 16 duplicates on the key blank, the cuts sensed by the cam 24 on the pattern key.

As soon as the carriage 22 has traversed sufficiently to permit the tip of the key to leave the cam 24, the coil spring 44 rotates the carriage 22 upwardly, or clockwise as viewed from the righthand side of FIG. 1, until such rotation of the carriage is arrested by engagement of the newly cut key with the rapidly rotating wire brush. It is desirable that the newly cut key engage the wire brush at a slight angle to the radius of the brush, so that the underside of the key, which is the portion most likely to contain burs and chips, will be efficiently exposed to the clockwise or upward rotation of the wire brush and will be thoroughly cleaned and burnished.

It is to be noted that the position of the wire brush rearwardly of the cutting wheel 16 and the consequent spring-induced rotation of the carriage 22, causes a diminution of the pressure exerted by the coil spring 44, so that the cut key is yieldably held against the rotating wire brush 17 at a lesser spring pressure than was the case when the key was in engagement with the cutting wheel 16. This decreased pressure is desirable, both from the standpoint of reducing wear on the brush as well as preventing inadvertent injury to the cuts on the key.

The traversing movement of the newly cut key across the rotating wire brush continues until the key loses contact with the brush, at which point the coil spring 44 causes further rotation of the carriage 22 upwardly, i.e. clockwise, until such movement is arrested by a stop rod 57 which projects from the body of the lower clamping unit 23 and is adapted to engage the fixed cam 24 to limit the clockwise movement of the carriage 22. In this position, the carriage continues its traversing movement for a short additional distance, until the spring end 45, which is still biased by the tension element 35, reaches the opening provided by the bent-up ear 36. At this point, the spring end 45 is suddenly freed of the retaining influence of the element 35, and this sudden release of the spring plus the weight of the carriage, causes the spring end 45 to hit or kick the ear 36 very sharply, sufficient to cause rotation of the control shaft 32 in a clockwise direction, wihch is aided by the weight of the control handle 33 as it moves rearwardly and downwardly. The ear 36 again engages the normally-closed switch 37 and causes it to open the electrical circuit to the motor 18. Substantially simultaneously, the clutch element 29 reaches the end of the thread on the traversing screw 26 and runs off the screw in response to residual rotation of the motor, thus causing the clutch to be automatically retracted and disengaged from the powered traversing mechanism. The carriage 22 has now returned to its position of rest upon the base 10, as was described at the start of the operating cycle. The machine is now inoperative and the clamping devices 23 can be opened and the keys removed.

Thus, once the keys have been placed in the clamping devices and the carriage moved to its proper position in front of the cutter, the movement of the operating handle 33 to "Automatic" position starts the cycle of cutting and traversing and wire brushing and automatically completes the cycle and shuts the machine off upon completion.

There may be occasional circumstances where automatic operation of the key cutting machine is not desired. For this reason, I have provided an intermediate or "Manual" position of the control handle 33, in which the control rod or shaft 32 is only rotated sufficiently to disengage the ear 36 from the switch 37 so as to permit the electrical circuit to the motor to be closed. This degree of rotation is not sufficient to cause the spring arm 45 to be biased by the tensioning element 35. Therefore, for manual operation, the clutch 29 is not reengaged with the traversing screw 26, but the carriage is manually traversed by the operator during the key cutting operation, as well as during the wire brushing operation. Upon completion of the manual operation, the control handle 33 is manually returned to its "Off" position to return the ear 36 into engagement with the switch 37 and shut off the motor.

The stop member 57 not only limits the rotation of carriage 22, after the wire-brushing operation has been completed, but also can be set to limit the rotation of carriage 22 toward the brush 17 after the cutter 16 has been traversed. By proper setting of the stop 57 the degree of wear and spreading on the brush 17 can be accurately controlled and minimized.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. In a key cutting and duplicating machine of the character described, the combination of a traversing carriage, key clamping means carried by said carriage, a rotatable cutter wheel disposed in the path of movement of said clamping means, a rotatable brushing wheel disposed in the path of movement of said clamping means, powered means for causing traversing of said carriage to bring said clamping means sequentially into operative traversing relationship to each of said wheels, said powered means comprising a rotatable screw engageable with said carriage to traversably displace said carriage, a reciprocating drive mechanism, and a uni-directional clutch coupling said mechanism to said screw to effect uni-directional rotation thereof.

2. A combination as defined in claim 1, including means for selectively engaging or disengaging said screw from driving relationship to said carriage.

3. A combination as defined in claim 1, wherein said reciprocating drive mechanism includes an eccentric driving element and a reciprocating link transmitting the movement of said driving element to said uni-directional clutch, and said link is yieldably deformable in response to overloading of said clutch.

4. In a key cutting and duplicating machine of the character described, the combination of a rotatable cutter wheel, a rotatable brushing wheel, a rockable carriage mounted for traversing movement relatively to said wheels, key clamping means carried by said carriage and rockable into operative engagement with said wheels, a yieldable element associated with said carriage and projecting angularly therefrom, tension-producing means movably mounted for selective biasing engagement with said yieldable element to urge said carriage toward said wheels, and power means for driving said wheels and said carriage.

5. A combination as defined in claim 4, including means associated with said carriage for selectively varying the angularity of said projecting yieldable element.

6. A combination as defined in claim 4, wherein said tension-producing means is a rotatable flange element disposed in overlying relationshp to said yieldable element and movable into energizing relationship to said yieldable element.

7. A combination as defined in claim 6, wherein said power means is an electrical motor, and including motor-operating switch means disposed in the path of movement of said tension-producing means, said switch means being closable in response to said biasing movement of said flange element and being openable in response to movement of said flange in the opposite direction.

8. In a key cutting and duplicating machine of the character described, the combination of a rotatable cutter wheel, a rotatable brushing wheel, a rockably mounted carriage movable in traversing relationship to said wheels, a first key clamping device carried by said carriage and engageable with said wheels, a second key clamping device carried by said carriage, a follower cam engageable by said second clamping device simultaneously with the engagement of said first clamping device with said cutter wheel, movable control means for selectively spring-loading said carriage to urge said clamping devices in a direction toward said wheels, electrically energized power means for driving said wheels and traversing said carriage, ad mean responsive to completion of traversing movement of said carriage relatively to said wheels for opening the electrical circuit to said power means.

9. A combination as defined in claim 8, wherein said follower cam is adjustably mounted relatively to said second clamping device.

10. A combination as defined in claim 8, including adjustable means for varying the spring-loading force on said carriage.

11. A combination as defined in claim 8, including means responsive to completion of traversing movement of said carriage relatively to said cutting wheel for reducing the spring-loading force on said carriage.

12. A combination as defined in claim 11, including an abutment provided on said carriage and movable with said carriage into engagement with said follower cam in response to predetermined traversing movement of said carriage, whereby to limit spring-induced rocking movement of said carriage.

13. In a key cutting and duplicating machine of the character described, the combination of a traversing carriage, key clamping means carried by said carriage, a rotatable cutter wheel disposed in the path of movement of said clamping means, a rotatable brushing wheel disposed in the path of movement of said clamping means, powered means for causing traversing of said carriage to bring said clamping means sequentially into operative traversing relationship to each of said wheels, and spring-loaded means of predetermined force associated with said carriage and urging said clamping means toward said cutter wheel, said means being responsive to completion of the traverse of said cutter wheel by said clamping means to urge said clamping means toward said brushing wheel with a force less than said predetermined force.

References Cited by the Examiner
UNITED STATES PATENTS

| | | | |
|---|---|---|---|
| 1,945,276 | 1/1934 | Kahl | 90—13.05 |
| 3,116,665 | 1/1964 | Reisner | 90—13.05 |

WILLIAM W. DYER, Jr., *Primary Examiner.*

G. A. DOST, *Assistant Examiner.*